United States Patent [19]
Tobey et al.

[11] Patent Number: 4,527,362
[45] Date of Patent: Jul. 9, 1985

[54] DEPLOYABLE TRUSS

[75] Inventors: William H. Tobey, Littleton; John V. Coyner, Conifer; William J. Gardner, Denver, all of Colo.

[73] Assignee: Martin Marietta Corporation, Bethesda, Md.

[21] Appl. No.: 373,578

[22] Filed: Apr. 30, 1982

[51] Int. Cl.³ .............................................. E04B 1/346
[52] U.S. Cl. ........................................ 52/71; 52/646
[58] Field of Search ................... 244/159, 173; 52/71, 52/64, 108, 109–111, 114, 646, 641, 639, 86, 80–84, 69; 182/152

[56] References Cited

U.S. PATENT DOCUMENTS

| | | |
|---|---|---|
| 704,552 | 7/1902 | Lieske . |
| 1,272,983 | 7/1918 | Menzo . |
| 2,668,331 | 2/1954 | Horn .................................. 20/1.123 |
| 3,080,193 | 3/1963 | Nimmo .................................. 297/159 |
| 3,176,633 | 4/1965 | Balfour .................................. 108/67 |
| 3,751,863 | 8/1973 | Lyons .................................. 52/111 |
| 3,849,952 | 11/1974 | Hanaoka .................................. 52/69 |
| 4,015,653 | 4/1977 | Slysh et al. .......................... 160/213 |
| 4,116,258 | 9/1978 | Slysh et al. .......................... 160/213 |

Primary Examiner—Carl D. Friedman
Attorney, Agent, or Firm—Patrick M. Hogan; Phillip L. DeArment; Gay Chin

[57] ABSTRACT

A deployable truss which includes at least one foldable module. Each module includes two fixed frames, two gate assemblies, two base members and diagonal braces which are arranged for folding compactly. Foldable panels can also be attached to the module. The truss can include multiple modules sharing common fixed frames or common gate assemblies.

20 Claims, 11 Drawing Figures

DEPLOYABLE TRUSS

BACKGROUND OF THE INVENTION

1. Field of the Invention

This invention relates to trusses and particularly to a new and improved truss which is deployable for supporting components, such as solar panels, and yet which can be compactly folded.

2. Description of the Prior Art

Trusses employed for certain uses are required to be variable in size. For example, a large space structure, such as that which supports an orbiting solar panel array, must be able to fit into a limited capacity launch vehicle during its launch into space. Yet once in space, the structure must be capable of expanding to a relatively large size in order to support a large solar array.

Different types of deployable trusses, that is, trusses which can expand from folded to unfolded, or deployed, configurations, as well as varying arrangements for folding the truss members, have been developed. In some cases, the structural integrity of the truss, rather than compactness, has been emphasized, resulting in large, heavy truss members. The overall size of such a truss once it deploys is therefore kept relatively small due to size and weight limitations of the launch vehicle. Correspondingly, the size of the solar array supported by the truss is also relatively small making it difficult to justify the high cost of launching the truss into space.

On the other hand, efforts at minimizing the folded size of deployable trusses in order to meet the launch vehicle size limitation while maintaining the large deployed size of the trusses have sometimes resulted in structural deficiencies when the trusses are deployed. Deficiencies in three structural areas are of concern: bending stiffness, torsional stiffness and thermal stability. Ideally, each should be maximized when the truss is deployed in order to provide a stable, long-life platform for solar panels or other components supported by the truss. One means of maximizing bending stiffness and torsional stiffness is by increasing the size of the truss relative to the size of the solar panels it supports. For example, increasing the height of a truss in a direction normal to the surface of the solar panel it supports would correspondingly increase the bending stiffness and torsional stiffness of the truss-panel structure. Also, a taller truss improves the thermal stability of the truss, that is, the resistance of the truss to deflection caused by differences in temperature between different members of the truss. The greater the distance between two parallel members of the truss which are subject to differing temperatures, the less will be the deflection caused by the temperature differential. Yet modifying current deployable truss designs by increasing the height of the truss would result in the folded truss being larger than originally designed and therefore perhaps too large to fit in a launch vehicle.

In view of the above mentioned problems, it is therefore an object of the present invention to provide a deployable truss which is relatively large when deployed yet which can be compactly folded.

Another object of the present invention is to provide a deployable truss having increased bending stiffness and increased torsional stiffness for better supporting an array of panels.

Yet another object of the present invention is to provide a deployable truss with increased thermal stability.

SUMMARY OF THE INVENTION

The present invention, in accordance with one embodiment thereof, comprises a deployable truss including at least one foldable module. Each module comprises two fixed frames, two gate assemblies and two base members which are arranged for folding compactly. The gate assemblies extend between and are pivotally connected with both fixed frames and are hinged for folding near the centers thereof. The base members extend between and are pivotally connected with both of the fixed frames and are foldable near the centers thereof.

In a particular embodiment of the invention, two panels are attached to the base members and are foldable with the module. A motor and deployment linkage can be connected with the base members for actuating the folding and deployment of the module. The truss can include a plurality of modules arranged whereby adjacent modules share common fixed frames or common gate assemblies.

BRIEF DESCRIPTION OF THE DRAWING

This invention will be better understood from the following description taken in conjunction with the accompanying drawing, wherein.

DESCRIPTION OF THE PREFERRED EMBODIMENT

Figures 1, 2:
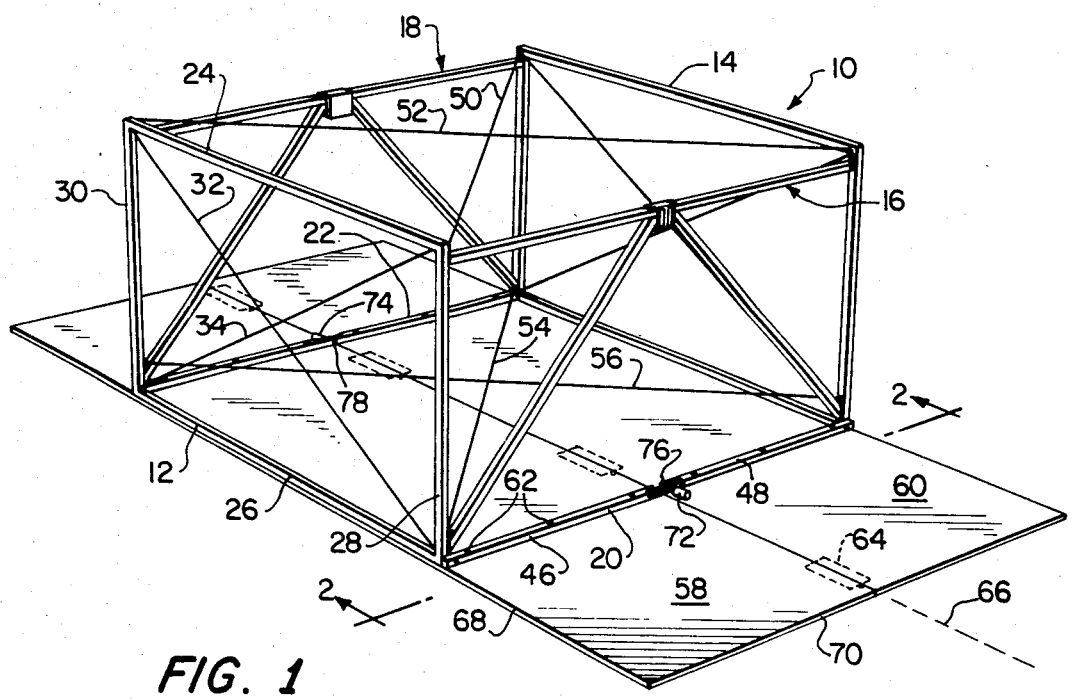
FIG. 1 is a perspective view of the module of the present invention shown in its deployed configuration.
FIG. 2 is a side cross-sectional view of the module taken along lines 2—2 of FIG. 1.

Turning now to a consideration of the drawing and in particular to FIG. 1, there is shown a foldable module 10 of the deployable truss of the present invention. The truss can include one or more of the modules 10, but for clarity, only one module 10 will initially be described.

FIG. 1 shows the module 10 in its deployed, or unfolded, configuration. The module 10 includes two fixed frames 12 and 14, two gate assemblies 16 and 18, and two base members 20 and 22.

Each of the two fixed frames 12 and 14 is preferably generally rectangular and includes an upper member 24, a lower member 26 and two side members 28 and 30. Each of the fixed frames 12 and 14 can also include two side diagonal braces 32 and 34 extending between opposite corners of the fixed frames to increase structural rigidity.

Each of the gate assemblies 16 and 18 extends between and is pivotally connected with both of the fixed frames 12 and 14. In the deployed configuration of FIG. 1, the fixed frames 12 and 14 are positioned apart a distance approximating the width of the unfolded gate assemblies. In order to permit folding of the module 10, each of the gate assemblies 16 and 18 is hinged for folding near the center thereof. The gate assemblies are configured such that they and other components of the module 10 can fold without interference. As is best seen in FIG. 2, one example of a suitable configuration for the gate assemblies comprises two gates 36 and 38 of substantially the same dimensions. Each of the gates 36 and 38 comprises a horizontal arm 40 and an angled arm 42. Disposed between the gates 36 and 38 and hingedly connected thereto is a crossover link 44 which includes hinge pins for receiving the inner ends of the horizontal and angled arms 40 and 42. The crossover link 44 preferably also includes an overcenter latch to lock the gate assembly 16 or 18 in the deployed position. The outer ends of the horizontal and angled arms 40 and 42 of the gates 36 and 38 are pivotally connected to side members 30 of both of the fixed frames 12 and 14. This arrangement permits the gate assemblies 16 and 18 to fold toward the interior of the module 10 at the crossover link 44 when the fixed frames 12 and 14 are moved toward each other during folding of the module 10. Of course, gate assemblies having other suitable shapes can also be employed if desired.

Returning to FIG. 1, the height of the gate assemblies 16 and 18 is preferably less than the distance between the upper and lower members 24 and 26 of the fixed frames 12 and 14. Such a height difference permits the gate assemblies to be pivotally positioned between the upper and lower members when the module 10 is in a folded configuration, as will be more fully explained hereinafter.

As can be seen in FIG. 1, each of the base members 20 and 22 extends between and is pivotally connected with the outside of both of the fixed frames 12 and 14, preferably near the intersection of the lower and side members 26 and 30. The base members 20 and 22 are hinged for folding near the centers thereof, the folding occurring in a plane parallel to the plane of the side members 30 to which each base member is connected. Each half 46 and 48 of each of the base members 20 and 22 can be hinged to each other or, as is shown in FIG. 1, the halves can be attached to other components which are hinged together.

The fixed frames 12 and 14, gate assemblies 16 and 18, and base members 20 and 22 can be fabricated from any appropriate material such as, for example, graphite epoxy composites. The members can also have any desired cross-sectional shape.

For structural rigidity, the module 10 preferably includes two upper diagonal braces 50 and 52 which extend diagonally between the upper members 24 of both of the fixed frames 12 and 14, and two lower diagonal braces 54 and 56 which extend diagonally between the lower members 26 of both of the fixed frames 12 and 14.

The module 10 as described thus far is a sufficiently complete structure to be employed by itself. Alternatively, the module 10 can have additional components attached to it. For example, the module 10 could include an antenna membrane of mesh (not shown) stretched across it or across several modules. Or, as is shown in FIG. 1, the module 10 can include one or more panels, such as solar panels.

When panels are employed, each module 10 preferably includes two panels 58 and 60 which are attached to the module in such a manner as to fold with the module. The panel 58 is attached to a half 46 of each of the base members 20 and 22 and the other panel 60 is attached to the other half 48 of each of the base members 20 and 22. The panels 58 and 60 can be attached to the base members 20 and 22 in any appropriate manner, such as with bolts 62.

The panels 58 and 60 are hinged together with hinges 64 along a hinge line, depicted by the dashed line 66. In order that the panels 58 and 60 will fold upwardly, the hinges 64 are preferably disposed on the lower surfaces of the panels and are thus shown in dashed lines. The hinge line 66 extends adjacent the center of the base members 20 and 22 where the halves 46 and 48 of the base members meet. As was indicated earlier, the hinges 64 also provide the hinging support for the halves 46 and 48 of the base members 20 and 22. The outer edges 68 of the panels 58 and 60 parallel to the hinge line 66 extend adjacent the lower members 26 of the fixed frames 12 and 14, while the end edges 70 of the panels extend beyond the base members 20 and 22 as far as is desired.

Any suitable internal or external actuation means can be employed to effect folding and deployment of the module 10. One suitable actuation means comprises two motors 72 and 74 which are powered electrically, hydraulically or otherwise. As is seen in FIG. 1, one of the motors is disposed adjacent each of the base members 20 and 22 and is drivingly connected with a deployment linkage 76 or 78 which connects the two halves 46 and 48 of each base member. Actuation of the motors 72 and 74 drives the deployment linkages 76 and 78 which in turn impart folding or deploying motion to the base members 20 and 22. The motors 72 and 74 are preferably synchronized such that the base members will fold or deploy substantially in unison.

Figure 3:
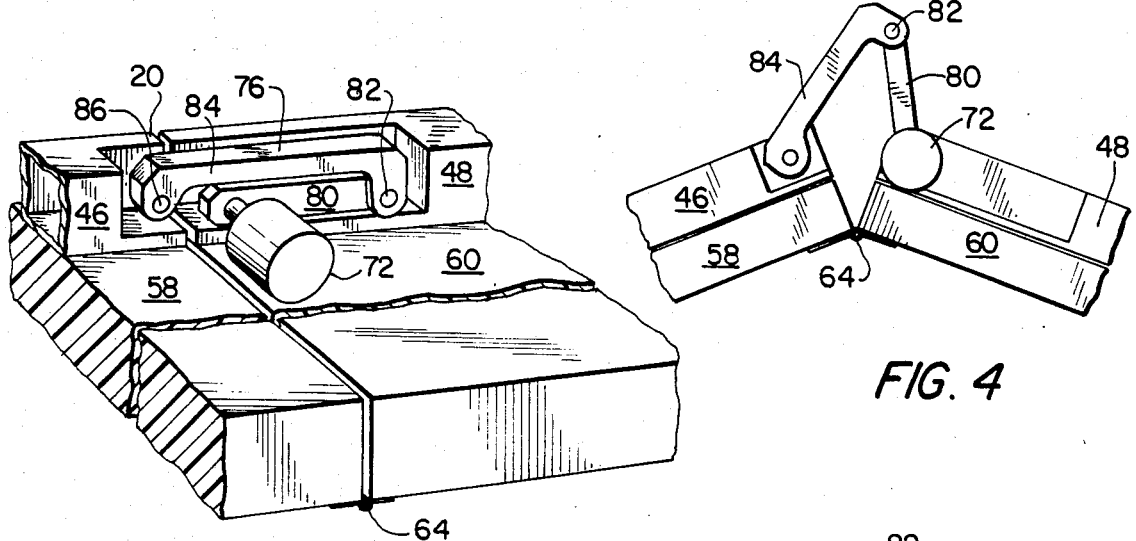
FIG. 3 is an enlarged, partially broken view of the motor and deployment linkage.
Figure 4:
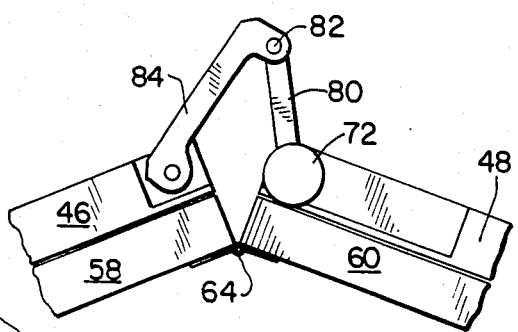
FIG. 4 is a side view of the motor and deployment linkage in an intermediate position.
Figure 5:
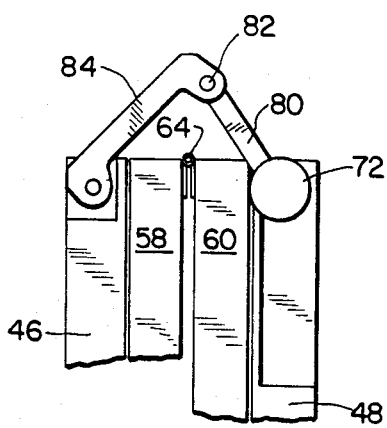
FIG. 5 is a side view of the motor and deployment linkage in a folded position.

One example of a suitable motor and deployment linkage arrangement is shown in FIG. 3. The motor 72 is fixedly mounted on one half 48 of the base member 20 and is drivingly connected to a latch crank 80 which is pivotally connected through a hinge pin 82 to one end of a latch arm 84. The other end of the latch arm 84 is pivotally connected to the other half 46 of the base member 20 through a hinge pin 86. Rotation of the latch crank 80 by the motor 72 in a counterclockwise direction causes the latch arm 84 to pivot counterclockwise. As can be seen in FIG. 4, torque applied by the motor 72 through the latch crank 80 and the latch arm 84 causes the halves 46 and 48 of the base member 20 as well as the panels 58 and 60 to fold about the hinges 64 until, as is shown in FIG. 5, the lower surfaces of the panels 58 and 60 substantially abut. The combined length of the latch crank 80 and the latch arm 84 is at least equal to the thicknesses of the two panels 58 and 60 such that, as is shown in FIG. 5, the panels can fold underneath them. Reversal of the motor direction will cause the two halves 46 and 48 of the base member 20 to unfold or deploy about the hinge 64.

The module 10 folds from the deployed configuration shown in FIG. 1 to the folded configuration shown in FIG. 7 as follows.

Figure 6:
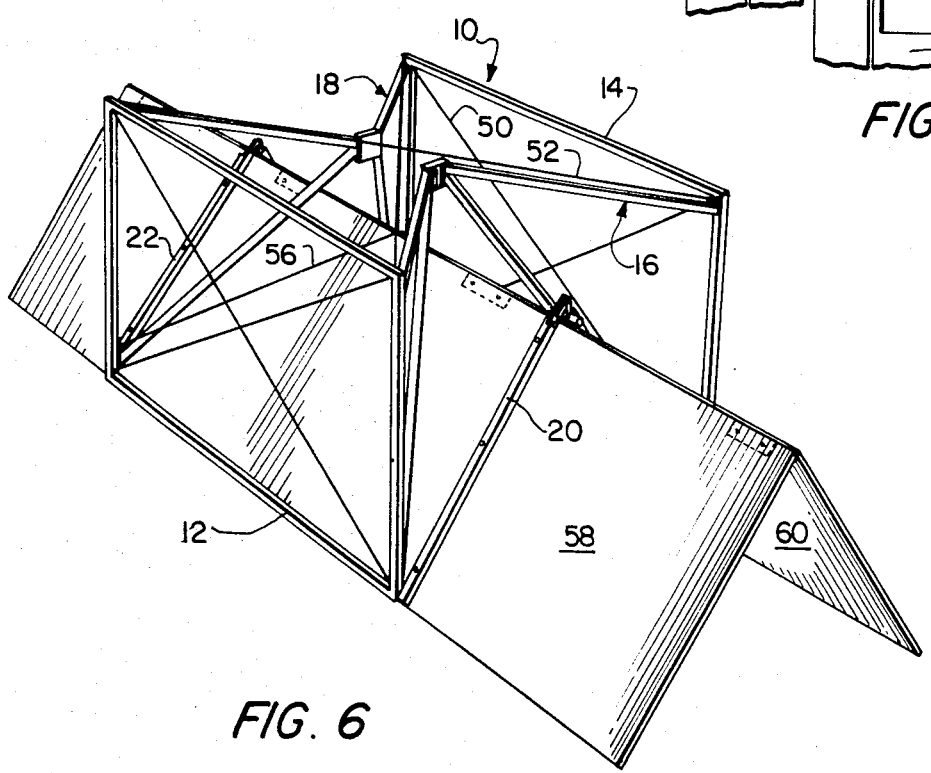
FIG. 6 is a perspective view of the module in a partially folded configuration.

Actuation means, such as the motors 72 and 74 shown in FIG. 1, cause the base members 20 and 22 to begin to fold in the manner described above. As can be seen in FIG. 6, as the base members 20 and 22 fold, they cause the panels 58 and 60 to also fold. At the same time, the folding base members cause the fixed frames 12 and 14 to be pulled closer together. Correspondingly, the gate assemblies 16 and 18 are caused to be folded near the centers thereof toward the interior of the module 10. Preferably, the upper diagonal braces 50 and 52 are telescopically configured to shorten as the fixed frames 12 and 14 draw closer to each other, and likewise lengthen as the fixed frames draw away from each other during deployment. An example of a telescopic configuration is a telescoping tape and tube arrangement comprising an inner tape and an outer tube. The inner tube slides within the outer tube to a certain predetermined maximum length, thus making the length of the overall diagonal member variable. The lower diagonal braces 54 and 56, which extend across the upper surfaces of the panels 58 and 60, are preferably foldable such that they fold with the panels and substantially retain their original lengths. The shape of the gate assemblies 16 and 18 is such that the gate assemblies and the panels 58 and 60 can fold at the same time without interfering with each other. Specifically, the inverted V formed by the two angled arms 42 of each of the gate assemblies provides clearance for the folding panels 58 and 60 going either into or out of the folded configuration.

Figure 7:
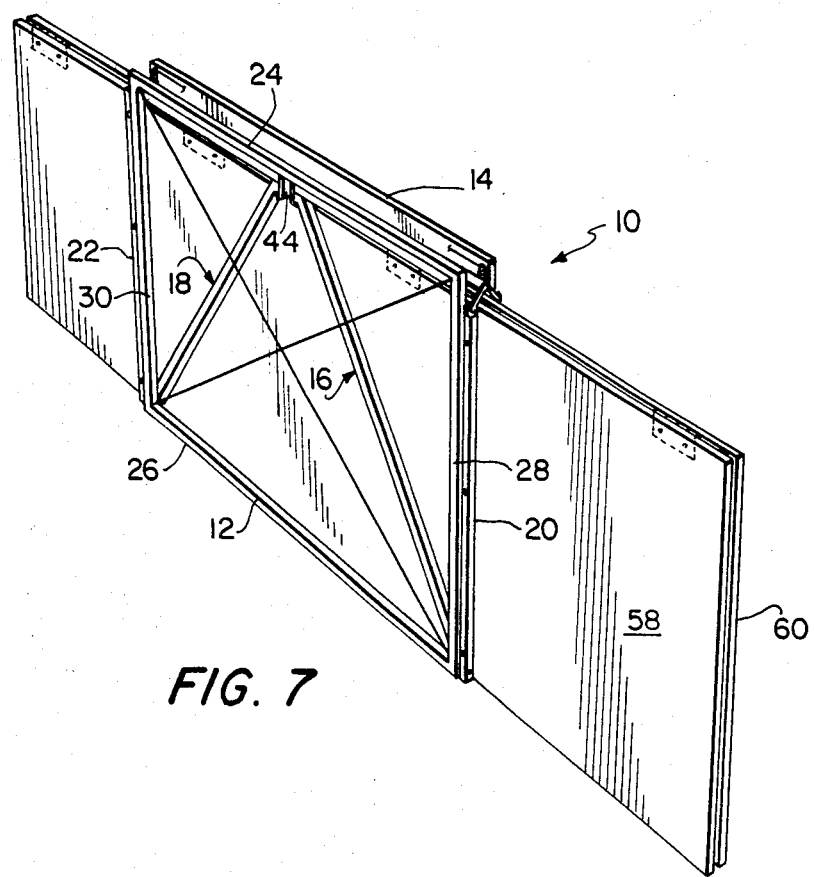
FIG. 7 is a perspective view of the module in its folded configuration.

Turning now to FIG. 7, the module 10 is shown in its folded configuration. The base members 20 and 22 are folded adjacent and on the outside of the side members 28 and 30 of the fixed frames 12 and 14. The fixed frames 12 and 14 are positioned closely adjacent each other with the gate assemblies 16 and 18 being folded between the fixed frames. As was earlier described, since the height of the gate assemblies 16 and 18 is less than the distance between the upper and lower members 24 and 26 of the fixed frames, the gate assemblies in their folded position are pivoted to a position such that at least a portion of them is between the upper and lower members. Thus, the otherwise open space within the fixed frames is occupied by the lower diagonal braces 54 and 56 and the folded gate assemblies 16 and 18, correspondingly reducing the size of the folded module 10.

The panels 58 and 60 are folded into a position between the fixed frames 12 and 14 such that the surfaces of the panels substantially abut. The width of each of the crossover links 44 of the gate assemblies is at least equal to the thicknesses of the two panels 58 and 60 such that the panels will fold underneath the crossover links when the module 10 is in its folded configuration. Likewise, the deployment linkages 76 are of a width at least equal to the thicknesses of the two panels 58 and 60 such that the panels will fit underneath the deployment linkages when in the folded configuration.

The module 10 deploys from the folded configuration shown in FIG. 7 to the deployed configuration of FIG. 1 in the reverse manner of that described above.

The above described compact manner in whch the gate assemblies 16 and 18 fold partially inside the fixed frames 12 and 14 while the base members 20 and 22 fold alongside the fixed frames permits the ratio of the height of the module, as measured along the side member 28, to the width of a panel 58, as measured from the panel edge 68 to the hinge line 66, to be greater than that of may prior art trusses. The greater height of the module relative to the panel increases bending stiffness and torsional stiffness of the module 10 and therefore provides a more stable, long-life support for the panels. The longer side members 28 and 30 also increase the thermal stability of the module 10. When the temperature of the upper member 24 differs from that of the lower member 26, the greater the distance between the upper and lower members, the less will be the deflection of the module due to the thermal differential.

Similarly, the manner of folding the module 10 permits the fixed frames 12 and 14, the gate assemblies 16 and 18 and the base members 20 and 22 to be fabricated of members of larger cross-sectional areas than in many prior art trusses without greatly increasing the size of the folded module. Such larger cross-sections also increase bending stiffness and torsional stiffness of the module 10.

Figure 8:
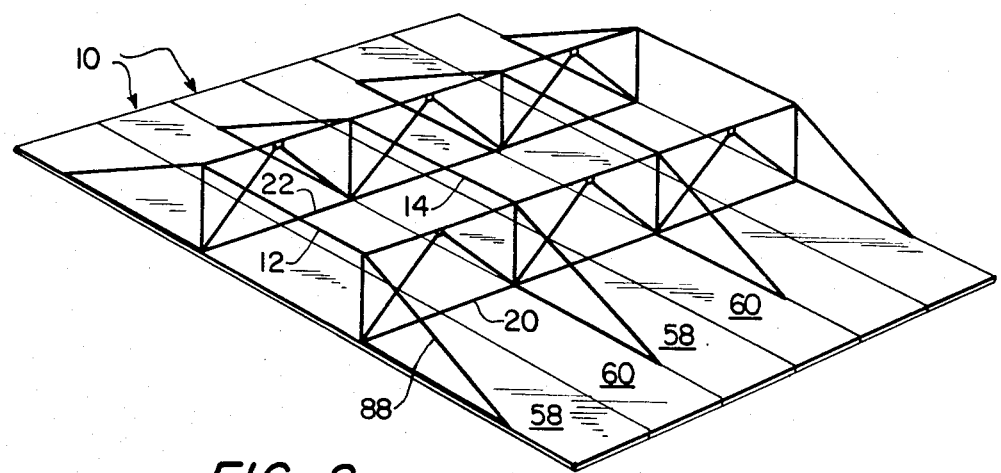
FIG. 8 is a perspective view of a multiple module truss in a deployed configuration.
Figure 9:
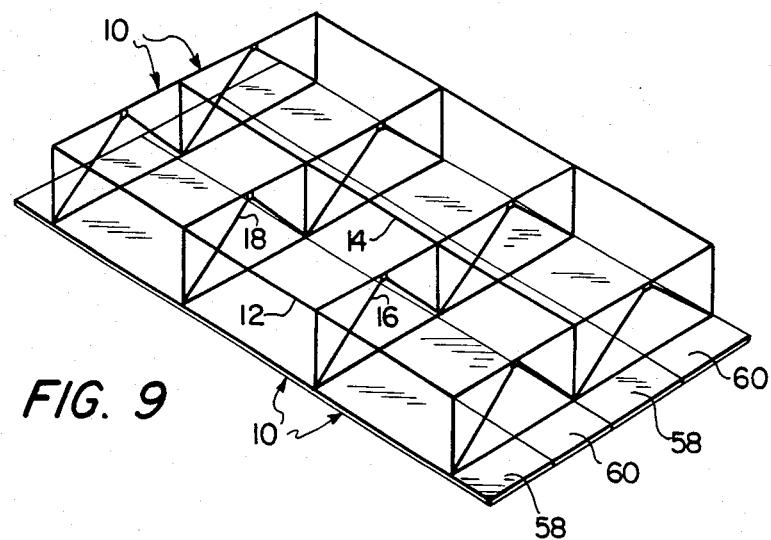
FIG. 9 is a perspective view of another multiple module truss in a deployed configuration.

The truss structure of the present invention can include more than one module 10. As can be seen in FIG. 8, a plurality of foldable modules 10 are arranged adjacent each other such that they share common fixed frames. Similarly, FIG. 9 shows the truss structure including a plurality of modules 10 which are arranged such that they not only share common fixed frames 12 and 14, but they also share common gate assemblies 16 and 18.

Figure 10:
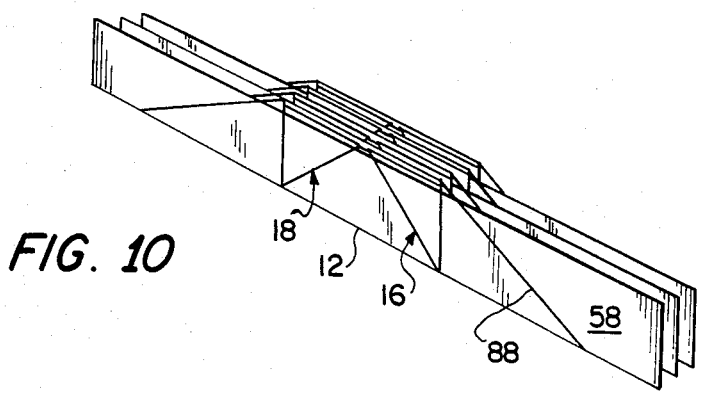
FIG. 10 is a perspective view of the multiple module truss of FIG. 8 in a folded configuration.
Figure 11:
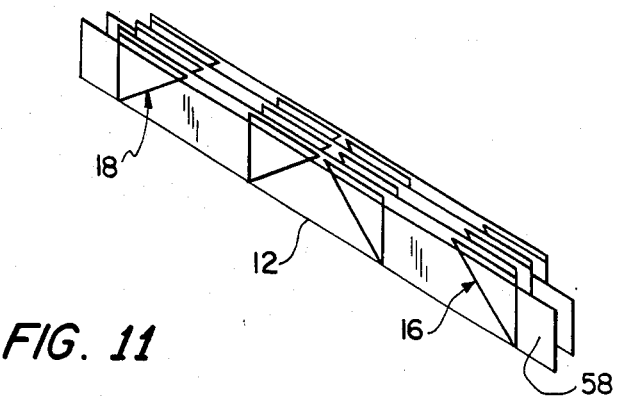
FIG. 11 is a perspective view of the multiple module truss of FIG. 9 in a folded configuration.

The above described multiple module trusses fold and deploy in the same manner as was described for the single module 10. FIG. 10 shows the truss of FIG. 8 in its folded configuration and FIG. 11 shows the truss of FIG. 9 in its folded configuration. In the folded configuration, the common fixed frames 12 and 14 and the folded panels 58 and 60 of the adjacent modules 10 have been positioned closely adjacent each other. Correspondingly, the gate assemblies 16 and 18 of each of the modules have been folded adjacent the fixed frames. As a result, the truss structure is a relatively compact unit in its folded configuration, yet in its deployed configuration is quite large.

FIGS. 8 and 10 also show outriggers 88 which can be employed to support panels 58 and 60 which extend a relatively long distance beyond the base members 20 and 22. Each of the outriggers is fixedly attached to a side member 28 or 30 and is hingedly attached to a side edge of one of the panels 58 or 60, thus allowing the panels to fold while the outriggers 88 remain in place.

It is to be understood that this invention is not limited to the particular embodiments disclosed and it is intended to cover all modificiations coming within the true spirit and scope of this invention as claimed.

What is claimed is:

1. A deployable truss comprising at least one foldable module, each said module comprising:
   a. two fixed frames, each of said fixed frames being generally rectangular comprising upper, lower and side members;
   b. two gate assemblies extending between and pivotally connected with a side member of both of said fixed frames, each of said gate assemblies being hinged for folding near the center thereof, said fixed frames and said gate assemblies being arranged whereby when said module is in a folded configuration, said fixed frames are positioned closely adjacent each other with said gate assemblies being folded therebetween, and when said module is in a deployed configuration, said fixed frames are positioned apart a distance approximating the width of the unfolded gate assemblies; and
   c. two base members extending between and pivotally connected with the outside of both of said fixed frames near the intersections of said lower and said side members thereof, each of said base members being foldable near the center thereof for folding in a plane parallel to the plane of said side members to which said base member is connected.

2. The truss of claim 1 wherein the height of said gate assemblies is less than the distance between said upper and said lower members of said fixed frames for thereby permitting said gate assemblies to be pivotally positioned between said upper and said lower members when said module is in a folded configuration.

3. The truss of claim 2 further comprising:
   a. two side diagonal braces within each of said fixed frames;
   b. two upper diagonal braces extending between said upper members of both of said fixed frames; and
   c. two lower diagonal braces extending between said lower members of both of said fixed frames.

4. The truss of claim 3 further comprising actuation means for effecting folding and deployment of said module.

5. The truss of claim 4 wherein said actuation means comprises at least one motor drivingly connected to a deployment linkage, said deployment linkage being connected with one of said base members, actuation of said motor imparting folding or deploying motion to said base members.

6. The truss of claim 5 further comprising at least one panel attached to said module in such a manner as to fold with said module.

7. The truss of claim 6 comprising two panels, each of said panels being attached to a portion of each of said base members for, when said module is in a folded configuration, being folded with said base members between said fixed frames.

8. The truss of claim 7 wherein said panels are hinged together along a hinge line adjacent the centers of said base members whereby the surfaces of said panels substantially abut when said module is in a folded configuration.

9. The truss of claim 8 wherein said gate assemblies are configured such that said gate assemblies and said panels can fold at the same time without interference.

10. The truss of claim 9 wherein each of said gate assemblies comprises two gates of substantially the same dimensions, each of said gates comprising a horizontal arm and an angled arm, each of said gates being hingedly connected to a crossover link disposed between said gates, said crossover link having a width at least equal to the thicknesses of said two panels thereby permitting said panels to fold underneath said crossover link when said module is in a folded configuration.

11. A deployable truss comprisisng at least one compactly foldable module, each said module comprising:
   a. two rectangular fixed frames, each of said fixed frames comprising upper, lower and two side members and two diagonal braces;
   b. two gate assemblies, each of said gate assemblies extending between and being pivotally connected with side members of both of said fixed frames and having a height less than the distance between said upper and said lower members of said fixed frames, each of said gate assemblies comprising two gates of substantially the same dimensions hingedly connected to a crossover link disposed between said gates for enabling said gate assemblies to fold at said crossover link, said gate assemblies and said fixed frames being arranged whereby when said module is in a folded configuration, said fixed frames are positioned closely adjacent each other with said gate assemblies being folded between said fixed frames and at least partially positioned between said upper and said lower members of said fixed frames, and when said module is in a deployed configuration, said fixed frames are positioned apart a distance approximating the width of the deployed gate assemblies;
   c. two base members, each of said base members extending between and being pivotally connected to the outside of both of said fixed frames near the intersections of said lower and said side members and being foldable near the center thereof for folding in a plane parallel to the plane of said side members to which said base member is connected;
   d. two panels hinged together along a hinge line adjacent the center of said base members, each of said panels being attached to a portion of each of said base members for, when said module is in a folded configuration, being folded with said base members between said fixed frames;
   e. two upper diagonal braces extending between said upper members of both of said fixed frames;
   f. two lower diagonal braces extending between said lower members of both of said fixed frames; and
   g. actuation means for effecting folding and deployment of said module.

12. The truss of claim 11 wherein said upper diagonal braces are telescopically configured for varying in length when said module is folded or deployed.

13. The truss of claim 12 wherein said lower diagonal braces extend across upper surfaces of said panels and are foldable with said panels.

14. The truss of claim 13 wherein said actuation means comprises a motor and a deployment linkage connected with each of said base members, actuation of said motor imparting folding or deploying motion through said deployment linkage to said base member.

15. The truss of claim 14 wherein the motors associated with said base members are synchronized such that said base members fold and deploy substantially in unison.

16. The truss of claim 15 wherein said deployment linkage comprises a latch crank and a latch arm pivotally connected at ends thereof and wherein said motor is fixedly mounted to a first half of one of said base members, the other end of said latch arm being pivotally connected with a second half of said one of said base members and the other end of said latch crank being drivingly connected with said motor whereby torque for folding and deploying said first and second halves of said base member is applied from said motor through said latch crank and said latch arm.

17. The truss of claim 14 futher comprising a plurality of outriggers for supporting said panels, each of said outriggers being fixedly attached to one of said side members and hingedly attached to a side edge of one of said panels.

18. The truss of claim 11 comprising a plurality of said foldable modules arranged whereby adjacent modules share common fixed frames.

19. The truss of claim 11 comprising a plurality of said foldable modules arranged whereby adjacent modules share common gate assemblies.

20. The truss of claim 11 comprising a plurality of said foldable modules arranged whereby adjacent modules share common fixed frames and common gate assemblies.

* * * * *